(12) United States Patent
Tian et al.

(10) Patent No.: US 12,185,273 B2
(45) Date of Patent: Dec. 31, 2024

(54) METHOD AND APPARATUS FOR INFORMATION TRANSMISSION, DEVICE, AND STORAGE MEDIUM

(71) Applicant: GUANGDONG OPPO MOBILE TELECOMMUNICATIONS CORP., LTD., Guangdong (CN)

(72) Inventors: Wenqiang Tian, Guangdong (CN); Zhe Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 407 days.

(21) Appl. No.: 17/722,401

(22) Filed: Apr. 18, 2022

(65) Prior Publication Data

US 2022/0240219 A1    Jul. 28, 2022

Related U.S. Application Data

(63) Continuation of application No. PCT/CN2019/113419, filed on Oct. 25, 2019.

(51) Int. Cl.
*H04W 16/28* (2009.01)
*H04W 36/00* (2009.01)
(Continued)

(52) U.S. Cl.
CPC ......... *H04W 64/006* (2013.01); *H04W 16/28* (2013.01); *H04W 36/0016* (2013.01); *H04W 84/06* (2013.01)

(58) Field of Classification Search
CPC ...... H04W 64/00; H04W 36/00; H04W 16/28
See application file for complete search history.

(56) References Cited

U.S. PATENT DOCUMENTS

| 5,612,701 A | 3/1997 | Diekelman | |
|---|---|---|---|
| 11,632,166 B2* | 4/2023 | Lucky | H04B 7/185 370/319 |
| 2016/0233949 A1* | 8/2016 | Tillet | H04W 4/10 |

FOREIGN PATENT DOCUMENTS

| CN | 1480005 | 3/2004 |
|---|---|---|
| CN | 102832985 | 12/2012 |

(Continued)

OTHER PUBLICATIONS

Mediatek Inc., "Details on DL Beam Management", 3GPP TSG RAN WG1 Meeting #89 R1-1707830 May 2017, pp. 1-8.
(Continued)

*Primary Examiner* — Michael T Vu
(74) *Attorney, Agent, or Firm* — JCIP GLOBAL INC.

(57) ABSTRACT

The present application relates to the technical field of communications, and provided therein are a method and apparatus for information transmission, a device, and a storage medium. The method comprises: in a first area, acquiring location information corresponding to a current location, the first area being covered by a network side device by means of a first beam and providing a first communication service; and reporting the location information, the location information being used for acquiring a second communication service provided by the network side device by means of a second beam, the second beam covering a second area, the second area being a sub-area of the first area, and the data transmission performance of the second communication service being greater than that of the first communication service. Thus, the network side device may provide a high-performance data transmission service for a terminal as needed.

16 Claims, 5 Drawing Sheets

---

Location information corresponding to the current location in a first area is obtained, the first area is covered by a first beam through a network side device, and a first communication service is provided — 401

The location information is reported. The location information is used to obtain a second communication service provided by the network side device through a second beam. The second beam covers a second area, the second area is a sub-area of the first area, and the data transmission performance of the second communication service is higher than the data transmission performance of the first communication service — 402

(51) Int. Cl.
H04W 64/00 (2009.01)
H04W 84/06 (2009.01)

(56) References Cited

FOREIGN PATENT DOCUMENTS

| WO | 2017193083 | 11/2017 |
| WO | 2018132438 | 7/2018 |

OTHER PUBLICATIONS

"International Search Report (Form PCT/ISA/210) of PCT/CN2019/113419", mailed on Jul. 29, 2020, with English translation thereof, pp. 1-4.

"Written Opinion of the International Searching Authority (Form PCT/ISA/237) of PCT/CN2019/113419", mailed on Jul. 29, 2020, with English translation thereof, pp. 1-6.

ZTE, Sanechips, "Report of Email Discussion [107#60] [NR/NTN] RACH capacity evaluation and procedures", 3GPP TSG-RAN WG2 Meeting #107bis R2-1912664, Oct. 2019, pp. 1-29.

Interdigital Inc., "Conditional Mobility for Non-Terrestrial Networks", 3GPP RAN WG2 Meeting #106 R2-1907840, May 2019, pp. 1-5.

"Search Report of Europe Counterpart Application No. 19950225.3", issued on Sep. 28, 2022, pp. 1-10.

\* cited by examiner

METHOD AND APPARATUS FOR INFORMATION TRANSMISSION, DEVICE, AND STORAGE MEDIUM

CROSS-REFERENCE TO RELATED APPLICATION

This application is a continuation of international PCT application serial no. PCT/CN2019/113419, filed on Oct. 25, 2019. The entirety of the above-mentioned patent applications are hereby incorporated by reference herein and made a part of this specification.

BACKGROUND

Technology Field

The application relates to the field of satellite communication technology, and particularly to, a method and an apparatus for information transmission, a device, and a storage medium.

Description of Related Art

Non-terrestrial networks (NTNs) generally use satellite communication to provide ground users with communication services and have many advantages compared with terrestrial communications (e.g., cellular networks). For example, a non-terrestrial network has the characteristics of wide coverage without being restricted by the geographic area where users are. It can provide services for areas such as oceans, mountains, and deserts that are difficult to cover by terrestrial communications.

In high-frequency deployment, to provide effective communication performance, NTN technology can use beamforming to provide the users with services. To ensure that terminals in all directions in the area covered by the satellite can be discovered and access the cell, the satellite can send synchronization signal blocks and necessary information required for cell access to different directions at different times in the form of beam scanning.

However, because the NTN technology has the characteristic of wide coverage, it means that the covered area requires more beam scanning times, which leads to a longer system delay.

SUMMARY

The embodiments of the application provide a method and an apparatus for information transmission, a device, and a storage medium, which can be used to solve the problem of a large system delay caused by a large number of beam scans in related technologies. The technical solution is illustrated as follows.

For one aspect, an information transmission method is provided, and the method includes steps as follows.

Location information corresponding to a current location in a first area is obtained. The first area is covered by a first beam through a network side device, and a first communication service is provided in the first area.

The location information is reported. The location information is used to obtain a second communication service provided by the network side device through a second beam, the second beam covers a second area, the second area is a sub-area of the first area, and data transmission performance of the second communication service is higher than data transmission performance of the first communication service.

For another aspect, an information transmission method is provided, and the method includes steps as follows.

A first communication service is provided through a first beam, and the first beam covers a first area.

When receiving location information sent by a terminal in the first area, a second communication service is provided through a second beam according to the location information. The second beam covers a second area, the second area is a sub-area of the first area, and data transmission performance of the second communication service is higher than data transmission performance of the first communication service.

For another aspect, an information transmission device is provided, and the device includes the followings.

An obtaining module is configured to obtain location information corresponding to a current location in a first area, the first area is covered by a first beam through a network side device, and a first communication service is provided in the first area.

A reporting module is configured to report the location information, the location information is used to obtain a second communication service provided by the network side device through the second beam, the second beam covers the second area, the second area is a sub-area of the first area, and data transmission performance of the second communication service is higher than data transmission performance of the first communication service.

For another aspect, an information transmission device is provided, and the device includes the followings.

A coverage module is configured to provide a first communication service through a first beam, and the first beam covers a first area.

A providing module is configured to provide a second communication service through a second beam according to location information when the location information sent by a terminal in the first area is received, the second beam covers a second area, the second area is a sub-area of the first area, and data transmission performance of the second communication service is higher than data transmission performance of the first communication service.

For another aspect, an apparatus is provided, the apparatus includes a processor and a memory. The memory stores at least one instruction, and the at least one instruction is used to be executed by the processor to implement methods described in any one of the one aspect or to implement methods described in any one of the another aspect.

For another aspect, a computer-readable storage medium is provided, the computer-readable storage medium stores at least one instruction, the at least one instruction is used to be executed by the processor to implement methods described in any one of the one aspect or to implement methods described in any one of the another aspect.

For another aspect, a computer program product is provided, the computer program product includes one or more computer programs, and when the computer programs are executed by a processor, it is used to implement methods described in any one of the one aspect or to implement methods described in any one of the another aspect.

The beneficial effects brought about by the technical solutions provided by the embodiments of the application include at least one of the followings.

The network side device provides the wide area coverage through the first beam. In the first area of the wide area coverage, the terminal obtains the location corresponding to the current location and reports the location information to the network side device, and meanwhile it means that the terminal needs to obtain high-performance data transmission services, so the network side device provides the second area where the terminal is located with a second communication service with high data transmission performance through the second beam according to the location information. Accordingly, the network side device can provide the terminal with high-performance data transmission services, which solves the problem of large time delay caused by periodic beam transmission in related technologies.

BRIEF DESCRIPTION OF THE DRAWINGS

The technical solutions in the embodiments of the application are illustrated below with reference to the drawings in the embodiments of the application. Obviously, the illustrated embodiments are a part of the embodiments of the application but not all of the embodiments.

According to the embodiments in the application, all other embodiments obtained by those ordinary skill in the art without creative work shall fall within the protection scope of the application.

DESCRIPTION OF THE EMBODIMENTS

Figure 1:
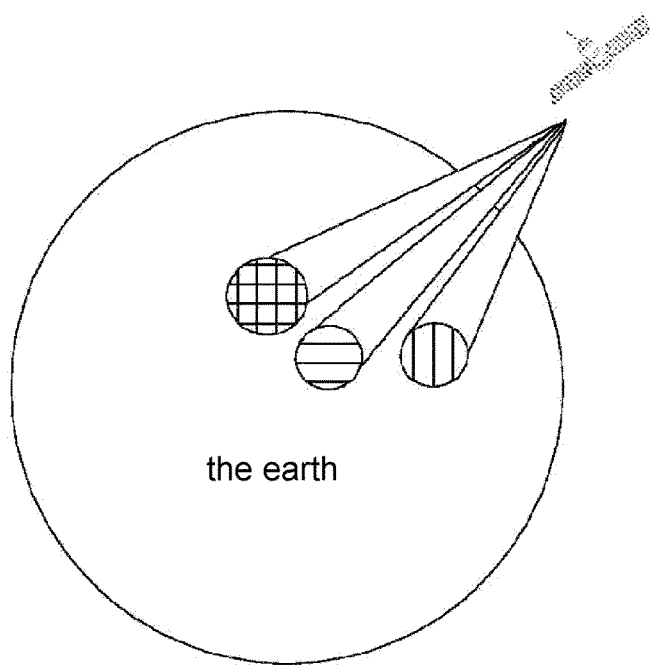
FIG. 1 is a schematic view of beam coverage provided by an exemplary embodiment of the application.

In order to make the objectives, technical solutions, and advantages of the application clearer, the implementations of the application will be further described in detail below with reference to the accompanying drawings.

Before describing in detail the information transmission method provided by the embodiments of the application, first briefly introduce the relevant knowledge, application scenarios, and implementation environment involved in the embodiments of the application.

First, a brief introduction to the relevant knowledge involved in the embodiments of the application is illustrated.

Beamforming: a signal processing technology using a sensor array to send and receive signals in a specific direction. In implementation, by adjusting the parameters of the basic unit of the phase array of the beam, the signal energy at certain angles is increased, while the signal energy at other angles is reduced, that is, the signal energy in a certain direction is relatively concentrated. For the terminal, this contributes more to improving the signal-to-noise ratio of the received signal and then contributes to providing the users with services through advanced coding and modulation methods such as high-order modulation, thereby obtaining better system performance. The beamforming can be used at both the signal transmitting end and the signal receiving end.

NTN technology: a method that most satellite communications use to provide the ground users with communication services. For the satellite communications, a single satellite can cover a large area, and the satellite can orbit the earth, so theoretically every corner of the earth can be covered by the satellite communications, that is, the satellite communications are not constrained by the area where the users are. Because of this, the satellite communications can be covered in remote areas, poor and undeveloped countries or regions at a lower cost, so that users in these regions or countries can enjoy advanced voice communications and mobile Internet technologies. In addition, the satellite communications have the characteristics of low cost and high stability and are not easily constrained by natural disasters.

According to the orbital height of communication satellites, the communication satellites can be categorized into low-earth orbit (LEO) satellite, medium-earth orbit (MEO) satellite, geostationary earth orbit (GEO) satellites, high elliptical orbit (HEO) satellite, and the like. At the current stage, the third generation partnership project (3GPP) mainly conducts research on the LEO satellites and the GEO satellites. The orbital height of a LEO satellite ranges from 500 km to 1500 km, and the corresponding orbital period is about 1.5 hours to 2 hours. The signal propagation delay of single-hop communication between users is generally less than 20 ms, and the maximum satellite visible time is 20 minutes. The NTN technology based on LEO satellites has the characteristics of short signal propagation distance, low link loss, and low requirements for the transmission power of the user terminal. The orbital height of the GEO satellite is 35786 km, and the rotation period around the earth is 24 hours. The signal propagation delay of single-hop communication between users is generally 250 ms. To ensure the coverage area of the satellite on the earth and increase the system capacity of the entire satellite communication system, the satellite uses multiple beams to cover the ground, that is, a single satellite can form dozens or even hundreds of satellite beams to cover the ground, and each satellite beam can cover a ground area with a diameter of tens to hundreds of kilometers.

Next, a brief introduction to the application scenarios involved in the embodiments of the application is illustrated.

In the satellite communication scenario, under high frequency deployment, to provide effective communication performance, the NTN system can provide users with services through beamforming, as shown in FIG. 1. That is, satellites can use the antenna array to form beams and provide users with access and services in the form of beam scanning through the beams. The characteristic of beam scanning is to form full coverage of the cell through different scanning areas of the beam in the time domain.

Figure 2:
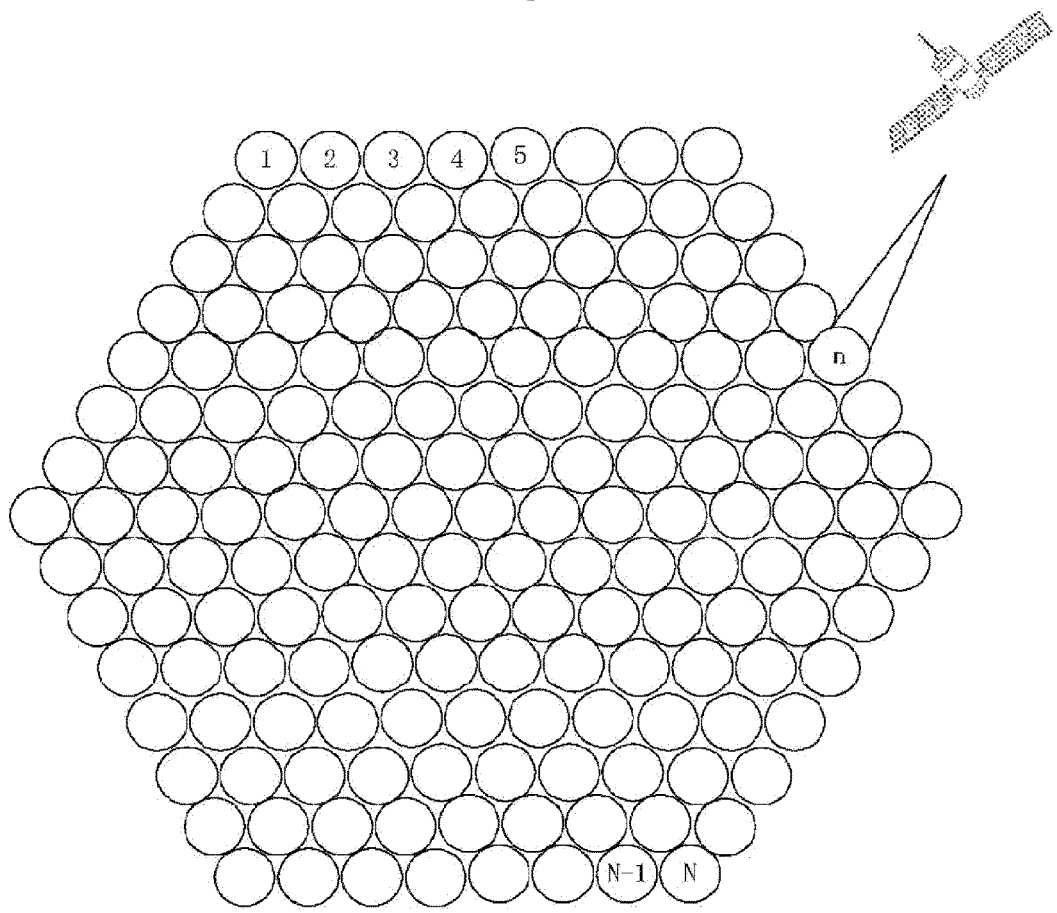
FIG. 2 is a schematic view of beam coverage provided by another exemplary embodiment of the application.

However, for the NTN system, the coverage of a single satellite is generally larger, so the area covered by the same beam requires more beam scanning times. For example, as shown in FIG. 2, a satellite covers an area on the ground through a beam. When N areas on the ground are covered by beam scanning, the satellite needs to perform N beam scanning, correspondingly. If synchronization signals, broadcasting, and random access resources are configured and transmitted in time sharing, the signals need to be sent periodically, and the service beam of the satellite needs to be guaranteed to scan the service area once during the period. That is, the periods of the signal and channel may be very large, which may bring a relatively large time delay to the system. For example, when a cell needs to provide cell coverage by beam scanning through 1000 times of high-performance beams, the synchronization signal of this cell needs to scan 1000 beams in a time sharing for a round of beam scanning, so the period of the synchronization signal may be very long, so that the process of cell discovery and access may be extended accordingly. Similarly, in related channel design with the periodic characteristics, such as radio network subsystem information (RNSI), system information block (SIB), paging, and the like, there is also the problem of large time delay.

For this reason, the embodiments of the application provide an information transmission method, which can solve the problem. For the specific implementation, refer to the embodiments in the subsequent paragraphs.

Next, a brief introduction to the implementation environment involved in the embodiments of the application is illustrated.

Figure 3:
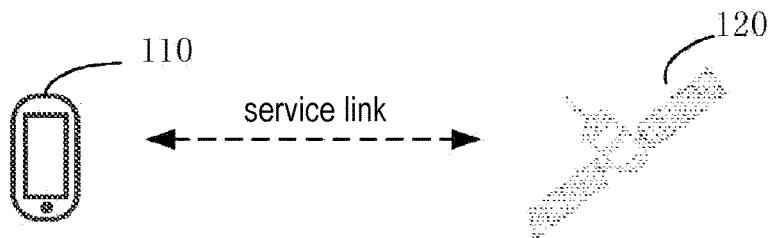
FIG. 3 is a schematic view of an implementation environment provided by an exemplary embodiment of the application.

Referring to FIG. 3, FIG. 3 is a schematic view of an implementation environment according to an exemplary embodiment. The implementation environment mainly includes a terminal 110 and a network side device 120. The network side device 120 may be a satellite and provide the terminal 110 with communication services in a beamforming manner.

In the NTN technology, the terminal 110 may also be referred to as an NTN terminal, and the NTN terminal may be a terminal defined by the third generation partnership project (3GPP). Alternatively, when the satellite does not directly serve the terminal defined by the 3GPP, the NTN terminal may be a terminal for a specific satellite system. In some embodiments, the terminal may also be referred to as user equipment (UE).

The terminal 110 and the satellite are connected in communication through a service link, and the service link refers to a radio link between the terminal 110 and the satellite. In addition, the terminal 110 may also support a wireless communication connection with a terrestrial access network.

Note that only one terminal included in the implementation environment is illustrated, and in another embodiment, multiple terminals may be further included in the implementation environment, but the embodiments of the application are not limited thereto.

In addition, note that the number of satellites sent in the implementation environment may be plural, and the satellites are connected through inter satellite/aerial links (ISL). The scenario of only one satellite is schematically illustrated in FIG. 3.

After introducing the relevant knowledge, application scenarios, and implementation environment involved in the embodiments of the application, with reference to the accompanied drawings, the information transmission method provided by the embodiments of the application may be described in detail below.

Figure 4:
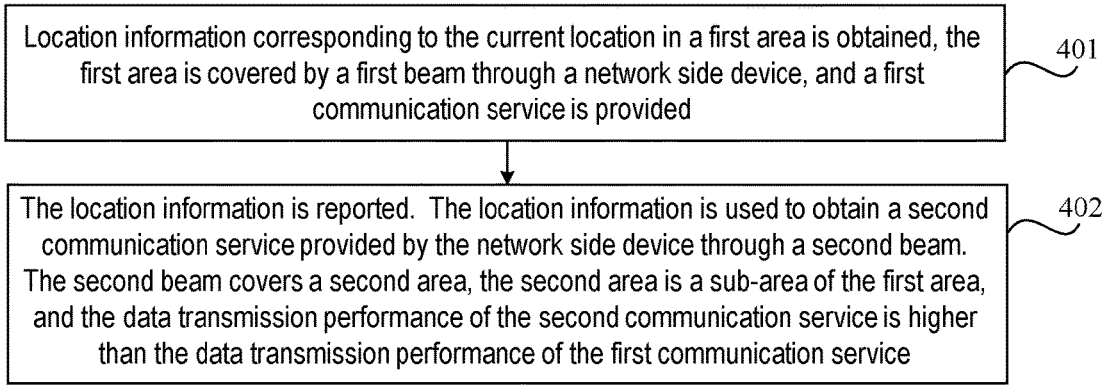
FIG. 4 is a flowchart of an information transmission method provided by an exemplary embodiment of the application.

Referring to FIG. 4, FIG. 4 is a flowchart of an information transmission method according to an exemplary embodiment. The information transmission method may be applied to the implementation environment shown in FIG. 3, and the information transmission method may include steps as follows.

In step 401, location information corresponding to the current location in the first area is obtained, the first area is covered by the first beam through the network side device, and the first communication service is provided in the first area.

The network side device may be the satellite.

Figure 5:
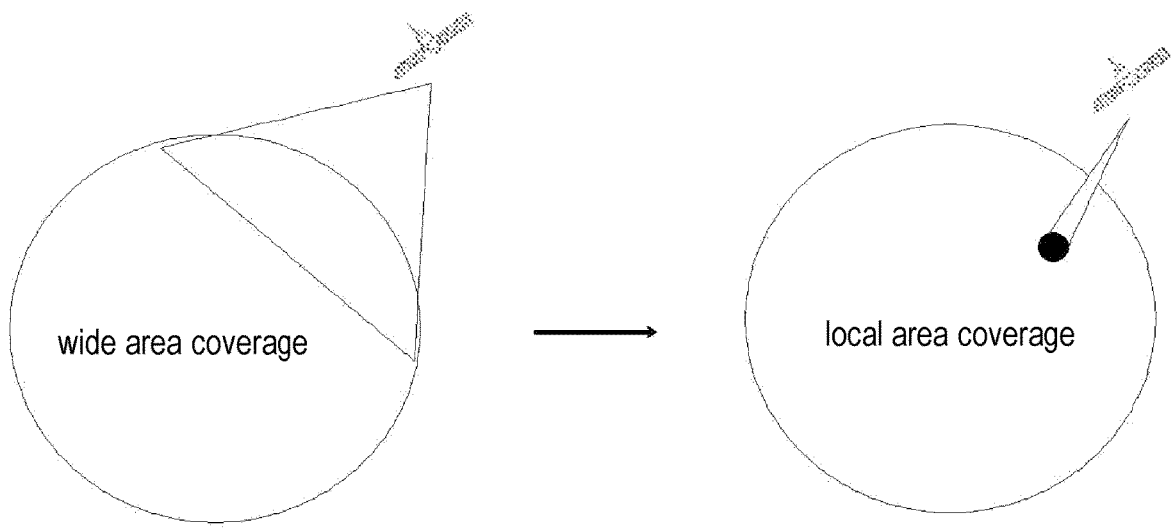
FIG. 5 is a schematic view of beam coverage provided by another exemplary embodiment of the application.

The first beam may be a wider beam. In this case, the network side device provides a wide area coverage for ground users through a wider first beam, that is, provides the first communication service, as shown in FIG. 5. Alternatively, the first beam may also include multiple first beams. In this case, the network side device provides wide area coverage for ground users through the multiple first beams, that is, provides the first communication service.

The first communication service can be understood as a basic access service, that is, the communication performance is relatively low. In the embodiment of the application, the area covered by the first beam is referred to as the first area, that is, the terminal in the first area can obtain the basic communication service provided by the satellite.

In some cases, the terminal may need to obtain high-performance data transmission services. In this case, the terminal may obtain the location information corresponding to the current location under the condition of the first communication service provided by the first cell.

The location information may be latitude and longitude information corresponding to the current location of the terminal or may also be information corresponding to the location area where the current location of the terminal is located, that is, it may be information of an area range where the current location is located.

The specific implementations for obtaining the location information corresponding to the current location also vary according to different content of the location information. The following methods may be included in a possible implementation of the application.

As an example, the specific implementation of obtaining the location information corresponding to the current location may include obtaining a location coordinate of the current location, and the location coordinate is used as the location information corresponding to the current location.

In the implementation, the location information is an absolute value, that is, the location information is the real location coordinate corresponding to the current location. As an example, the location coordinate may be obtained through positioning, such as global positioning system (GPS) or Beidou navigation satellite system, and exemplarily, the location coordinate may be GPS information, positioning information of Beidou navigation satellite system, and the like.

As another example, the specific implementation of obtaining the location information corresponding to the current location may include obtaining the location coordinate of the current location, determining the location area identifier of the area where the current location is located according to the location coordinate, and using the location area identifier as the location information corresponding to the current location.

In the implementation, the location information is information corresponding to a location area. That is, the terminal can obtain the location coordinate of the current location by the manner and then determine the location area identifier of the area where the current location is located according to the determined location coordinate, so as to use the location area identifier as the location information corresponding to the current location.

In a possible implementation, the specific implementation of determining the location area identifier of the area where the current location is located according to the location coordinate may include two possible manners as follows.

In the first possible implementation, the area range where the location coordinate is located is determined, and the location area identifier of the area where the current location is located is determined according to the correspondence between the area range and the location area identifier.

The area range can be described by the location coordinate on the boundary of the corresponding location area.

The correspondence between the area range and the location area identifier can be configured by the network side device in advance. That is, for the first area covered by the network side device, the first area can be divided into several sub-areas, each sub-area corresponds to an area range, each area range corresponds to a location area identifier, and the network side device can configure the correspondence between the area range and the location area identifier to the terminal.

Accordingly, for the terminal, after determining the area range of the location coordinate where the current location is located, thereby determining the location area where the current location is located according to the area range, and then obtaining the location area identifier corresponding to the location area, the obtained location area identifier is used as the location information corresponding to the current location.

In the second possible implementation, the location area identifier of the area where the current location is located is determined according to the location coordinate and a reference computing rule.

The reference computing rule may be configured by the network side device or may also be predefined.

In the implementation, arithmetic processing can be performed according to the location coordinate and the reference computing rule, so as to determine the location area identifier of the area where the current location is located. For example, for a first area with a size of 100*100, the terminal may determine the area corresponding to the range of longitude [0,10] and latitude [0,10] as a sub-area of the first area according to the reference computing rule, then the sub-area can be numbered, and so on, multiple sub-areas can be determined in the first area, and each sub-area can be numbered in order. Accordingly, according to the location coordinate and the reference computing rule, the area where the current location is located can be numbered, so as to determine the corresponding location area identifier.

In step 402, the location information is reported. The location information is used to obtain a second communication service provided by the network side device through a second beam. The second beam covers a second area, the second area is a sub-area of the first area, and the data transmission performance of the second communication service is higher than the data transmission performance of the first communication service.

After obtaining the location information, the terminal reports the location information to the network side device. Accordingly, the network side device can determine the area corresponding to the location of the terminal according to the location information, and the second communication service is provided through the second beam. In the implementation, the network side device can adjust the parameters of beamforming, so as to provide the second communication service through the second beam. Generally speaking, the second beam is narrower than the first beam, and the signal energy corresponding to the second beam is higher than the signal energy corresponding to the first beam, that is, the signal energy provided by the second beam is more concentrated, thereby providing the terminal with a high-performance data transmission service.

In the implementation, multiple specific implementations for the terminal to report the location information may be included.

In a possible implementation of the application, when the location information includes the location area identifier, the specific implementation of reporting the location information may include determining a random access resource corresponding to the location area identifier according to the correspondence between the location area identifier and the random access resource, and reporting the location area identifier through the random access resource.

The correspondence between the location area identifier and the random access resource may be configured by the network side device, or may also be predefined.

The random access resource includes time domain resources and/or frequency domain resources and/or code domain resources used for random access.

In addition, one location area identifier may correspond to one or more random access resources.

That is, the location information can be reported to the network side device through random access. Different location area identifiers correspondingly use different random access resources for reporting. Accordingly, for the network side device, according to the random access resources used by the terminal, the corresponding location area identifiers can be obtained.

As mentioned, the location information corresponding to the current location of the terminal may be real longitude and latitude information or may also be a location area identifier, so the foregoing description is illustrated with how to report the location information when the location information is a location area identifier. In another embodiment, no matter whether the location information is real longitude and latitude information or a location area identifier, reporting the location information can be implemented in any one of the following ways.

(1) Report the location information through a MSG3 in a contention-based random access process.

The random access includes the contention-based random access process and a non-contention-based random access process. The contention-based random access process includes four steps. Specifically, a. the terminal sends a MSG1 to the network side device for sending a preamble code; b. the network side device sends a MSG2 (also known as random access response (RAR)) to the terminal based on the MSG2; c. The terminal monitors the physical downlink control channel (PDCCH) in the RAR window to obtain the MSG2, and when the terminal receives the MSG2, it sends the MSG3 to the network side device; d. The network side device sends a MSG4 to the terminal based on the MSG3.

Therefore, in the contention-based random access process, when the location information needs to be reported, the terminal can carry the location information through the MSG3 to implement the report.

(2) Report the location information through an uplink transmission message in a two-step random access process.

The two-step random access process includes two steps: a. the UE sends a MSGA to the network side device; b. the network side device sends MSGB to the terminal based on the MSG1.

In the embodiment, the uplink transmission message may be the MSGA, that is, the terminal may upload the location information through the MSGA.

(3) Report the location information through a scheduling request (SR).

The scheduling request can be used to obtain resources for transmitting uplink data from the network side device. For example, when there is a service transmission demand, the terminal can send the scheduling request to the network side device. In implementation, the terminal may carry the location information in the scheduling request, so as to implement the report of the location information.

(4) Report the location information through uplink control information (UCI).

The UCI usually includes information related to the current status of the UE, such as whether the UE currently is required to request uplink resources, the downlink quality currently detected by the UE, and the like. The information is not acquired by the network side device and can only be reported by the UE. In the process of reporting the information, the UE may carry the location information through the UCI.

(5) Report the location information through a media access control (MAC) control element (CE).

The MAC CE is MAC layer signaling, and the terminal can carry the location information through the MAC CE. Specifically, the terminal can be configured with a MAC entity, the MAC entity is used to transmit the MAC CE, and the location information is carried in the MAC CE.

(6) Report the location information through RRC signaling.

During the RRC establishment process, the terminal may carry the location information in the RRC signaling, so that the location information is reported through the RRC signaling.

As mentioned, the terminal may obtain the location information and report the location information only when it is determined that there is a need to obtain high-performance data transmission services in the first area. Next, an introduce to the situations when it is determined that there is a need for the terminal to obtain high-performance data transmission services is illustrated.

As an example, in the initial access process, the location information is reported through random access.

During the initial access process, the terminal may need to obtain high-performance data transmission services. It is not difficult to understand that the random access usually needs to be triggered during the initial access. Therefore, in this case, the terminal can obtain the location information and report the location information through random access.

Specifically, the specific implementation of reporting the location information through random access may include steps as follows.

A. When the location information includes the location area identifier, the terminal can report the location information through different random access resources or report the location area identifier.

B. The terminal reports the location information through the MSG3 in the contention-based random access process.

C. The terminal reports the location information through the uplink transmission message in the two-step random access process.

For the specific introduction to the implementation corresponding to the B and the C, refer to the foregoing description.

As an example, when there is a need for transmitting an uplink service, the location information is reported through the scheduling request.

When there is the need for transmitting the uplink service, the terminal needs to send the scheduling request to the network side device. In addition, because there are uplink services that need to be transmitted, the first communication service is generally difficult to meet business needs, and to this end, the terminal can obtain the location information corresponding to the current location and report the location information, so that the network side device provides the terminal with a high-performance second communication service. In this case, the terminal may carry the location information in the scheduling request to implement reporting.

As an example, a handover command is received, and the handover command includes the location area configuration information of the target cell. According to the handover command, handover to the target cell. In the handover process, according to the location area configuration information, the location information corresponding to the location is reported.

The location area configuration information may be used to indicate which method is used to report the location information, and/or the representation form of the reported location information, and/or the relevant rules for determining the location information, etc.

Figure 6:
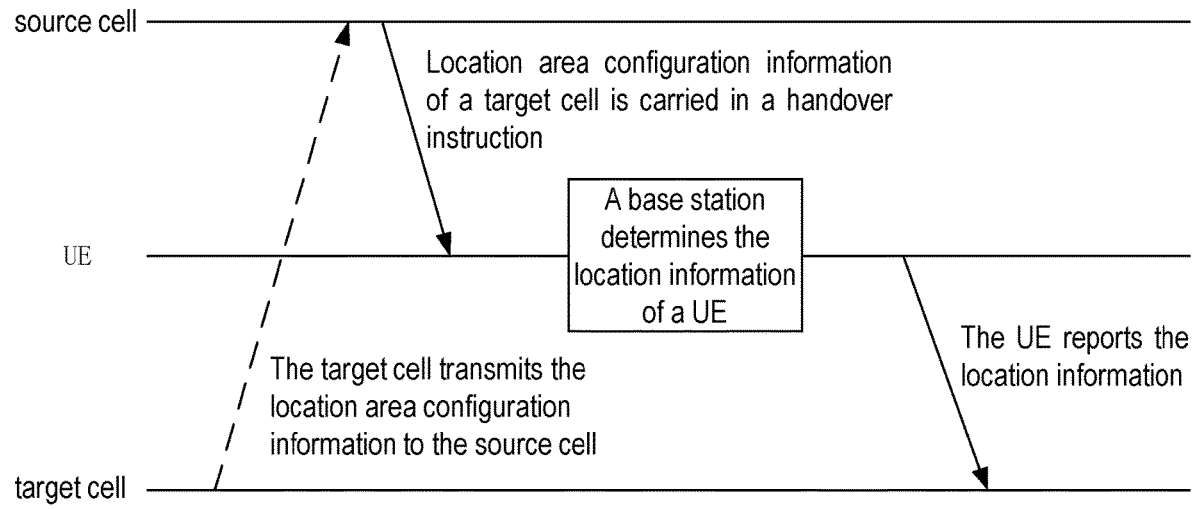
FIG. 6 is a flowchart of a handover process provided by an exemplary embodiment of the application.

That is, when the terminal is in the process of handover from the current cell to the target cell, the location information can be reported. In the handover scenario, the target cell can transmit the location area configuration information to the terminal through the handover command. Specifically, as shown in FIG. 6, the target cell can send the location area configuration information to a source cell, and the source cell forwards the location area configuration information to the terminal. Accordingly, the terminal can use the implementation to transmit the location information corresponding to the location of the terminal based on the obtained location area configuration information.

Note that during the handover process, the terminal can report location information in a method from any of method (1) to method (6), or when the location information is a location area identifier, the corresponding random access resources can be used for reporting.

As an example, when it is detected that the current location has changed, location information corresponding to the changed location is obtained, and the location information corresponding to the changed location is reported.

Figure 7:
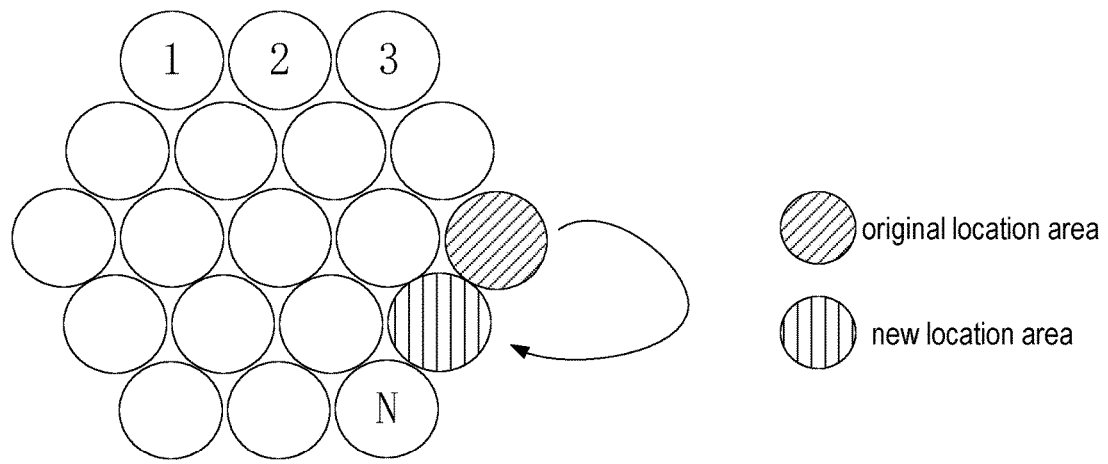
FIG. 7 is a schematic diagram of location update provided by an exemplary embodiment of the application.

It is not difficult to understand that the terminal is usually in a mobile state, so the location of the terminal may constantly change. For example, referring to FIG. 7, when the location of the terminal changes, to ensure that the second communication service can be obtained at the changed location, the terminal may report updated location information.

Furthermore, the implementation of detecting whether the current location has changed may include steps as follows.

(1) When it is detected that the location area is changed, it is determined that the current location has changed.

As mentioned, the location information can be the location area identifier, that is, it corresponds to a location area. Therefore, although the real location of the terminal is changing, the terminal may still be in the location area corresponding to the reported location area identifier. In this case, there is no need to report the location information, that is, it can be considered that the current location has not changed. If the location area of the terminal is no longer the location area corresponding to the reported location area identifier, the terminal needs to re-determine the location area identifier corresponding to the updated location area, that is, it can be determined that the current location sends a change.

(2) When it is detected that the change value of the location coordinate is greater than the specified threshold, it is determined that the current location has changed.

The specified threshold may be configured by the network side device, or the specified threshold may also be pre-defined.

In the implementation, it means that the location information is the location coordinate of the current location of the terminal. If it is detected that the change value of the location coordinate is greater than the specified threshold, it means that the current location of the terminal is far from the location when the location coordinate is reported. Since the range of the second communication service is limited, to ensure that the terminal can continue to obtain the second communication range, the terminal needs to report the location information corresponding to the updated location, that is, it is determined that the current location has changed. In addition, if the change value of the location coordinate is not greater than the specified threshold, it means that the current location of the terminal is relatively close to the location when the location coordinate is reported. For example, the terminal is hardly moved, under this condition, the terminal may not report the location information, and it can be considered that the current location does not send any change.

Accordingly, only when a change in the current location is detected, the location information is reported to the network side device, which can save the operating power consumption of the terminal.

Note that when reporting the updated location information, the terminal may report the updated location information in a method from any of method (1) to method (5), or when the updated location information is a location area identifier, the updated location information can be reported through the corresponding random access resource.

Furthermore, the terminal reports capability information, the capability information includes target indication information, and the target indication information is used to indicate whether the terminal has the ability to report the location information.

That is, the capability information of the terminal may include the target indication information about the reporting capability to report the location information, and the target indication information is used to indicate whether the terminal has the reporting capability to report the location information. In implementation, the terminal may report the capability information to the network side device. For example, the capability information may be reported to the network side device during the process of registration, initial access, and the like.

Furthermore, when the target indication information indicates having an ability to report the location information, the location information is reported.

It is not difficult to understand that the terminal may or may not have the reporting capability. Therefore, the terminal can check whether it has the reporting capability before reporting the location information. If the terminal does, the operation of reporting the location information is performed, or it is not performed.

In a possible implementation of the application, the reported indication information is received, and the reported indication information is used to indicate whether it needs to report the location information.

As an example, the reported indication information may be sent in a broadcast manner. For example, it may be carried by a master information block (MIB), a SIB1, or other SIBs. Alternatively, it may be sent through a radio resource control (RRC) signaling, or for example, it may be carried through a reconfiguration message.

That is, the network side device can determine whether the terminal needs to report the location information. When the network side device determines that there is such a need, the reported indication information is set to indicate that the location information needs to be reported. When the network side device does not have such a need, for example, when the network side device does not work through wide area access coverage and local area transmission performance improvement, the reported indication information can be set to indicate that there is no need to report the location information. The specific notification method may be notified in the broadcast (MIB, SIB1, or other SIBs) or through the RRC signaling (e.g., the reconfiguration message). Furthermore, when the reported indication information indicates that the location information needs to be reported, the location information is reported.

For the terminal, if the received reported indication information is used to indicate that the location information needs to be reported, when the terminal has a need to obtain a high-performance data transmission service, it obtains the location information corresponding to the current location and then reports the location information. In addition, if the reported indication information indicates that there is no need to report the location information, the terminal does not perform the operations of obtaining the location information and reporting the location information.

In addition, note that the foregoing description is illustrated based on an example in which the network side device sends the reported indication information to the terminal regardless of whether it needs to report the location information. In another possible implementation, if the network side device does not need the terminal to report the location information, it may not send any indication for reporting the location information. For the terminal, if it does not receive any indication for reporting the location information, it is determined that there is no need to report the location information, which can save the consumption of sending the indication information.

In the embodiment of the application, the network side device provides the wide area coverage through the first beam. In the first area of the wide area coverage, the terminal obtains the location corresponding to the current location and reports the location information to the network side device, and meanwhile it means that the terminal needs to obtain high-performance data transmission services, so the network side device provides the second area where the terminal is located with a second communication service with high-data transmission performance through the second beam according to the location information. Accordingly, the network side device can provide the terminal with high-performance data transmission services, which solves the problem of large time delay caused by periodic beam transmission in related technologies.

Figure 8:
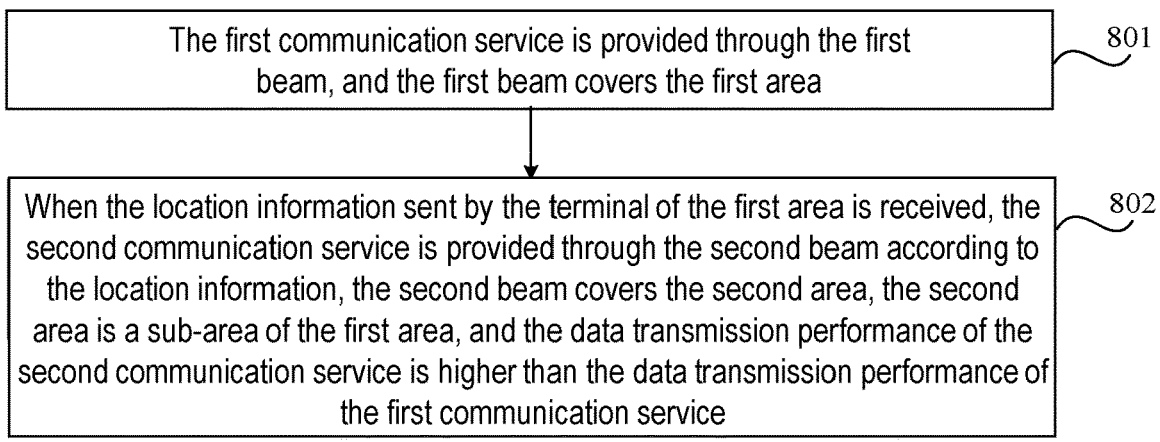
FIG. 8 is a flowchart of an information transmission method provided by another exemplary embodiment of the application.

Referring to FIG. 8, FIG. 8 is a flowchart of an information transmission method provided by another exemplary embodiment. The method can be applied in the foregoing implementation environment and is mainly executed by the network side device. The method may include steps as follows.

Step 801: the first communication service is provided through the first beam, and the first beam covers the first area.

Step 802: when the location information sent by the terminal of the first area is received, the second communication service is provided through the second beam according to the location information, the second beam covers the second area, the second area is a sub-area of the first area, and the data transmission performance of the second communication service is higher than the data transmission performance of the first communication service.

In a possible implementation of the application, the location information is the location coordinate of the current location of the terminal.

In a possible implementation of the application, the location information is a location area identifier of the area where the current location of the terminal is located.

In a possible implementation of the application, when the location information includes the location area identifier, the location area identifier is obtained through the corresponding random access resources.

In a possible implementation of the application, the location information is obtained through ways as follows.

The location information is obtained through the MSG3 in the contention-based random access process.

Alternatively, the location information is obtained through the uplink transmission message in the two-step random access process.

Alternatively, the location information is obtained through the scheduling request.

Alternatively, the location information is obtained through the uplink control information UCI.

Alternatively, the location information is obtained through the media access control (MAC) control element (CE).

Alternatively, the location information is obtained through the radio resource control (RRC) signaling.

In a possible implementation of the application, the method further includes a step as follows.

The changed location information is received after the location reported by the terminal is changed.

In a possible implementation of the application, the method further includes steps as follows.

The handover command is sent, and the handover command includes the location area configuration information of the target cell.

The location information sent by the terminal based on the location area configuration information during the handover process is received.

In a possible implementation of the application, the method further includes a step as follows.

In the initial access process, the location information is obtained through random access.

In a possible implementation of the application, the method further includes a step as follows.

The capability information is received, the capability information includes the target indication information, and the target indication information is used to indicate whether the terminal has the ability to report the location information.

In a possible implementation of the application, the method further includes steps as follows.

The reported indication information is sent, and the reported indication information is used to indicate whether the location information needs to be reported.

The execution principle of the network side device is similar to that of the terminal side. For details, refer to the specific embodiments of the terminal side illustrated in the foregoing paragraphs.

Figure 9:
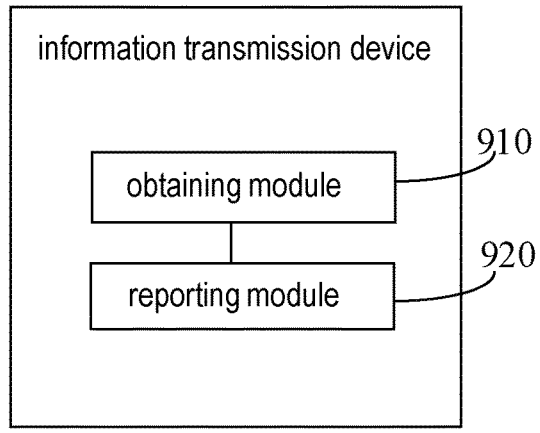
FIG. 9 is a schematic view of a structure of an information transmission device provided by an exemplary embodiment of the application.

Referring to FIG. 9, FIG. 9 is a schematic view of a structure of an information transmission device according to an embodiment. The device may include the followings.

An obtaining module 910 is configured to obtain the location information corresponding to the current location in the first area, the first area is covered by the first beam through the network side device, and the first communication service is provided in the first area.

A reporting module 920 is configured to report the location information, and the location information is used to obtain the second communication service provided by the network side device through the second beam. The second beam covers the second area, the second area is a sub-area of the first area, and the data transmission performance of the second communication service is higher than the data transmission performance of the first communication service.

In a possible implementation of the application, the obtaining module 910 is configured to execute the followings.

Obtain the location coordinate of the current location.

Use the location coordinate as the location information corresponding to the current location.

In a possible implementation of the application, the obtaining module 910 is configured to execute the followings.

Obtain the location coordinate of the current location.

According to the location coordinate, determine the location area identifier of the area where the current location is located.

Use the location area identifier as the location information corresponding to the current location.

In a possible implementation of the application, the obtaining module 910 is configured to execute the followings.

Determine the area range where the location coordinate is located.

According to the correspondence between the area range and the location area identifier, determine the location area identifier of the area where the current location is located.

In a possible implementation of the application, the obtaining module 910 is configured to execute the followings.

According to the location coordinate, determine the location area identifier of the area where the current location is located according to the reference computing rule.

In a possible implementation of the application, the reporting module 920 is configured to execute the followings.

When the location information includes the location area identifier, determine the random access resource corresponding to the location area identifier according to the correspondence between the location area identifier and the random access resource.

Report the location area identifier through the random access resource.

In a possible implementation of the application, the reporting module 920 is configured to execute the followings.

Report the location information through the MSG3 in the contention-based random access process.

Alternatively, report the location information through the uplink transmission message in the two-step random access process.

Alternatively, report the location information through the scheduling request.

Alternatively, report the location information through the uplink control information UCI.

Alternatively, report the location information through the MAC CE.

Alternatively, report the location information through the RRC signaling.

In a possible implementation of the application, the reporting module 920 is configured to execute the followings.

When it is detected that the current location has changed, obtain location information corresponding to the changed location.

Report the location information corresponding to the changed location.

In a possible implementation of the application, the reporting module 920 is configured to execute the followings.

When it is detected that the location area has changed, determine that the current location has changed.

Alternatively, when it is detected that the change value of the location coordinate is greater than the specified threshold, determine that the current location has changed.

In a possible implementation of the application, the reporting module 920 is configured to execute the followings.

Receive the handover command, and the handover command includes the location area configuration information of the target cell.

Handover to the target cell according to the handover command.

During the handover process, report the location information corresponding to the location according to the location area configuration information.

In a possible implementation of the application, the reporting module 920 is configured to execute the followings.

In the initial access process, report the location information through random access.

In a possible implementation of the application, the reporting module 920 is configured to execute the followings.

When there is a need for transmitting the uplink service, report the location information through the scheduling request.

In a possible implementation of the application, the reporting module 920 is configured to execute the followings.

Report the capability information, the capability information includes the target indication information, and the target indication information is used to indicate whether it has the ability to report the location information.

In a possible implementation of the application, the reporting module 920 is configured to execute the followings.

When the target indication information indicates the ability to report the location information, report the location information.

In a possible implementation of the application, the obtaining module 910 is further configured to execute the followings.

Receive the reported indication information, and the reported indication information is used to indicate whether the location information needs to be reported.

In a possible implementation of the application, the reporting module 920 is configured to execute the followings.

When the reported indication information indicates that the location information needs to be reported, report the location information.

In the embodiment of the application, the network side device provides the wide area coverage through the first beam. In the first area covered by the wide area, the terminal obtains the location corresponding to the current location and reports the location information to the network side device, and meanwhile it means that the terminal needs to obtain high-performance data transmission services, so the network side device provides the second area where the terminal is located with a second communication service with high data transmission performance through the second beam according to the location information. Accordingly, the network side device can provide the terminal with high-performance data transmission services, which solves the problem of large time delay caused by periodic beam transmission in related technologies.

Figure 10:
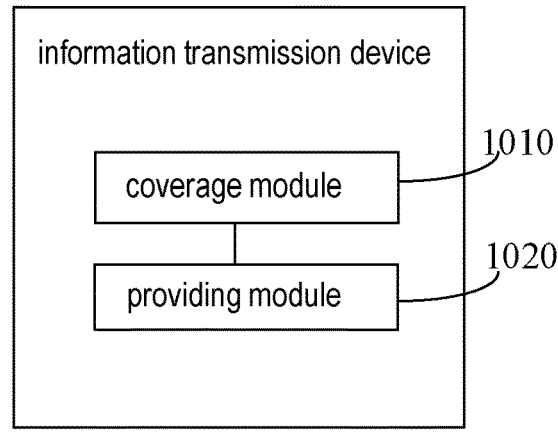
FIG. 10 is a schematic view of a structure of an information transmission device provided by another exemplary embodiment of the application.

Referring to FIG. 10, FIG. 10 is a schematic view of a structure of an information transmission device provided according to an exemplary embodiment. The device may include the followings.

A coverage module 1010 is configured to provide the first communication service through the first beam, and the first beam covers the first area.

A providing module 1020 is configured to provide the second communication service through the second beam according to the location information when the location information sent by the terminal in the first area is received, the second beam covers the second area, the second area is a sub-area of the first area, and the data transmission performance of the second communication service is higher than the data transmission performance of the first communication service.

In a possible implementation of the application, the location information is the location coordinate of the current location of the terminal.

In a possible implementation of the application, the location information is a location area identifier of the area where the current location of the terminal is located.

In a possible implementation of the application, when the location information includes the location area identifier, the location area identifier is obtained through the corresponding random access resource.

In a possible implementation of the application, the location information is obtained through ways as follows.

The location information is obtained through the MSG3 in the contention-based random access process.

Alternatively, the location information is obtained through the uplink transmission message in the two-step random access process.

Alternatively, the location information is obtained through the scheduling request.

Alternatively, the location information is obtained through the uplink control information UCI.

Alternatively, the location information is obtained through the MAC CE.

Alternatively, the location information is obtained through the RRC signaling.

In a possible implementation of the application, the providing module 1020 is further configured to execute the followings.

Receive the changed location information after the location reported by the terminal is changed.

In a possible implementation of the application, the providing module 1020 is further configured to execute the followings.

Send the handover command, and the handover command includes the location area configuration information of the target cell.

Receive the location information sent by the terminal based on the location area configuration information during the handover process.

In a possible implementation of the application, the providing module 1020 is further configured to execute the followings.

In the initial access process, the location information is obtained through random access.

In a possible implementation of the application, the providing module 1020 is further configured to execute the followings.

Receive the capability information, the capability information includes the target indication information, and the target indication information is used to indicate whether the terminal has the ability to report the location information.

In a possible implementation of the application, the providing module 1020 is further configured to execute the followings.

Send the reported indication information, and the reported indication information is used to indicate whether the location information needs to be reported.

In the embodiment of the application, the network side device provides the wide area coverage through the first beam. In the first area covered by the wide area, the terminal obtains the location corresponding to the current location and reports the location information to the network side device, and meanwhile it means that the terminal needs to obtain high-performance data transmission services, so the network side device provides the second area where the terminal is located with a second communication service with high data transmission performance through the second beam according to the location information. Accordingly, the network side device can provide the terminal with high-performance data transmission services, which solves the problem of large time delay caused by periodic beam transmission in related technologies.

Figure 11:
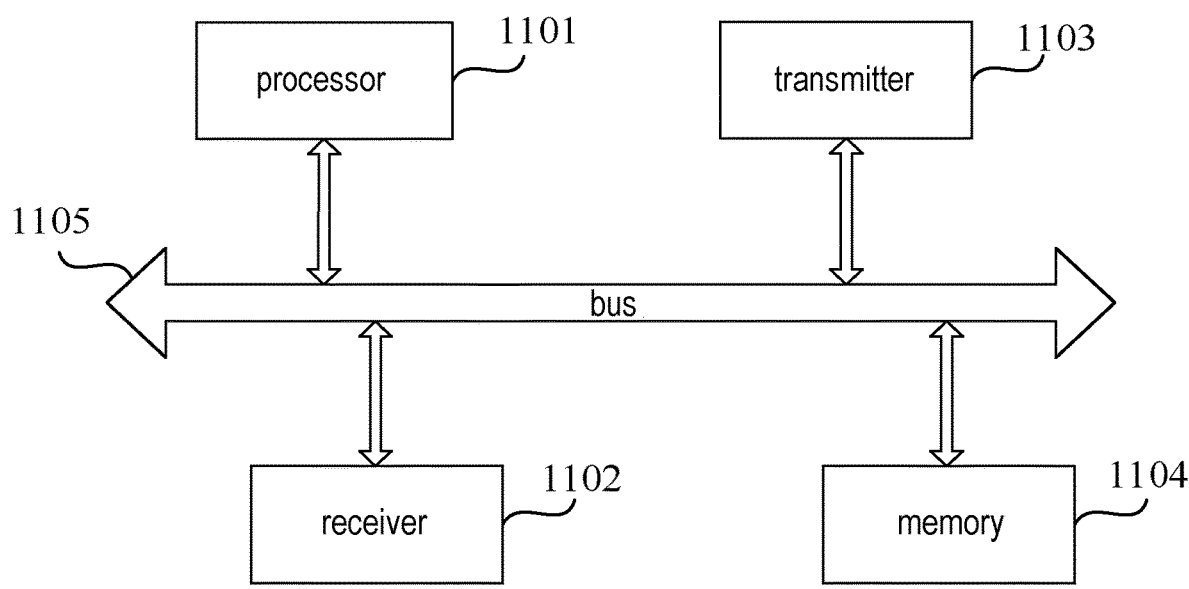
FIG. 11 is a schematic view of a structure of an apparatus provided by an exemplary embodiment of the application.

Referring to FIG. 11, FIG. 11 is a schematic view of a structure of an apparatus provided by an exemplary embodiment of the application. The apparatus may be the terminal, or the apparatus may also be the network side device. The apparatus includes a processor 1101, a receiver 1102, a transmitter 1103, a memory 1104, and a bus 1105.

The processor 1101 includes one or more processing cores, and the processor 1101 executes various functional applications and information processing by running software programs and modules.

The receiver 1102 and the transmitter 1103 may be implemented as a communication component, and the communication component may be a communication chip.

The memory 1104 is connected to the processor 1101 through the bus 1105.

The memory 1104 may be used to store at least one instruction, and the processor 1101 is used to execute the at least one instruction, so as to implement each step executed by the device in each of the foregoing method embodiments.

In addition, the memory 1104 can be implemented by any type of volatile or non-volatile storage devices or a combination thereof. The volatile or non-volatile storage device includes but is not limited to a disk, a CD-ROM, an electrically erasable programmable read-only memory (EEPROM), an erasable programmable read-only memory (EPROM), a static anytime access memory (SRAM), a read-only memory (ROM), a magnetic memory, a flash memory, or a programmable read-only memory (PROM).

The application provides a computer-readable storage medium in which at least one instruction is stored, and the at least one instruction is loaded and executed by the processor to implement the methods provided in each of the foregoing method embodiments.

The application also provides a computer program product. When the computer program product runs on a computer, the computer is enabled to execute the methods provided in each of the foregoing method embodiments.

A person of ordinary skill in the art can understand that all or part of the steps in the foregoing embodiments can be implemented by hardware or can be completed by a program to instruct relevant hardware, the program may be stored in a computer-readable storage medium, and the storage medium may be a read-only memory, a magnetic disk, or a compact disk.

The foregoing descriptions are only preferred embodiments of the application and are not intended to limit the application. Any modification, equivalent replacement, improvement, and the like made within the spirit and principle of the application shall be included in the protection scope of the application.

What is claimed is:

1. An information transmission method, adapted for a terminal, wherein the method comprises:
    obtaining location information corresponding to a current location in a first area, wherein the first area is covered by a first beam through a network side device, a first communication service is provided in the first area, and the step of obtaining the location information corresponding to the current location comprises:
        obtaining a location coordinate of the current location;
        determining a location area identifier of an area where the current location is located according to the location coordinate; and
        using the location area identifier as the location information corresponding to the current location; and
    reporting the location information, wherein the location information is used to obtain a second communication service provided by the network side device through a second beam, the second beam covers a second area, the second area is a sub-area of the first area, data transmission performance of the second communication service is higher than data transmission performance of the first communication service, and the step of reporting the location information comprises:
        when the location information comprises the location area identifier, determining a random access resource corresponding to the location area identifier according to correspondence between the location area identifier and the random access resource; and
        reporting the location area identifier through the random access resource.

2. The method according to claim 1, wherein the step of obtaining the location information corresponding to the current location comprises:
    using the location coordinate as the location information corresponding to the current location.

3. The method according to claim 2, wherein the step of reporting the location information is implemented in any of the following ways:
  reporting the location information through a MSG3 in a contention-based random access process;
  reporting the location information through an uplink transmission message in a two-step random access process;
  reporting the location information through a scheduling request;
  reporting the location information through uplink control information (UCI);
  reporting the location information through a media access control (MAC) control unit (CE); or
  reporting the location information through a radio resource control (RRC) signaling.

4. The method according to claim 3, wherein the method further comprises:
  when it is detected that the current location has changed, obtaining location information corresponding to a changed location; and
  reporting the location information corresponding to the changed location.

5. The method according to claim 3, wherein the method further comprises:
  receiving a handover command, wherein the handover command comprises location area configuration information of a target cell;
  handing over to the target cell according to the handover command;
  during a handover process, reporting location information corresponding to the current location according to the location area configuration information.

6. The method according to claim 1, wherein the method further comprises:
  reporting capability information, wherein the capability information comprises target indication information, and the target indication information is used to indicate whether it has an ability to report the location information.

7. The method according to claim 1, wherein the method further comprises:
  receiving reported indication information, wherein the reported indication information is used to indicate whether the location information needs to be reported.

8. An information transmission method, adapted for a network side device, wherein the method comprises:
  providing a first communication service through a first beam, wherein the first beam covers a first area; and
  when receiving location information sent by a terminal in the first area, providing a second communication service through a second beam according to the location information, wherein the second beam covers a second area, the second area is a sub-area of the first area, data transmission performance of the second communication service is higher than data transmission performance of the first communication service, the location information is a location area identifier of an area where a current location of the terminal is located, when the location information comprises the location area identifier, the location area identifier is obtained through a random access resource corresponding to the location area identifier, and the random access resource is determined according to correspondence between the location area identifier and the random access resource.

9. The method according to claim 8, wherein the location information is a location coordinate of a current location of the terminal.

10. The method according to claim 8, wherein the location information is obtained through ways as follows:
  obtaining the location information through a MSG3 in a contention-based random access process;
  obtaining the location information through the uplink transmission message in a two-step random access process;
  obtaining the location information through a scheduling request;
  obtaining the location information through uplink control information (UCI);
  obtaining the location information through a media access control (MAC) control unit (CE); or
  obtaining the location information through a radio resource control (RRC) signaling.

11. The method according to claim 8, wherein the method further comprises:
  receiving changed location information after the location reported by the terminal is changed.

12. The method according to claim 8, wherein the method further comprises:
  sending a handover command, wherein the handover command comprises location area configuration information of a target cell; and
  receiving the location information sent by the terminal based on the location area configuration information during the handover process.

13. The method according to claim 8, wherein the method further comprises:
  receiving capability information, wherein the capability information comprises target indication information, and the target indication information is used to indicate whether the terminal has an ability to report the location information.

14. The method according to claim 8, wherein the method further comprises:
  sending reported indication information, wherein the reported indication information is used to indicate whether the location information needs to be reported.

15. An information transmission device, configured in a terminal, wherein the device comprises:
  an obtaining module configured to obtain location information corresponding to a current location in a first area, wherein the first area is covered by a first beam through a network side device, a first communication service is provided in the first area, and the obtaining module is further configured to:
    obtain a location coordinate of the current location;
    determine a location area identifier of an area where the current location is located according to the location coordinate; and
    use the location area identifier as the location information corresponding to the current location; and
  a reporting module configured to report the location information, wherein the location information is used to obtain a second communication service provided by the network side device through the second beam, the second beam covers the second area, the second area is a sub-area of the first area, data transmission performance of the second communication service is higher than data transmission performance of the first communication service, and the reporting module is further configured to:

when the location information comprises the location area identifier, determine a random access resource corresponding to the location area identifier according to correspondence between the location area identifier and the random access resource; and report the location area identifier through the random access resource.

16. The device according to claim 15, wherein the obtaining module is configured to:

use the location coordinate as the location information corresponding to the current location.

* * * * *